2,366,722

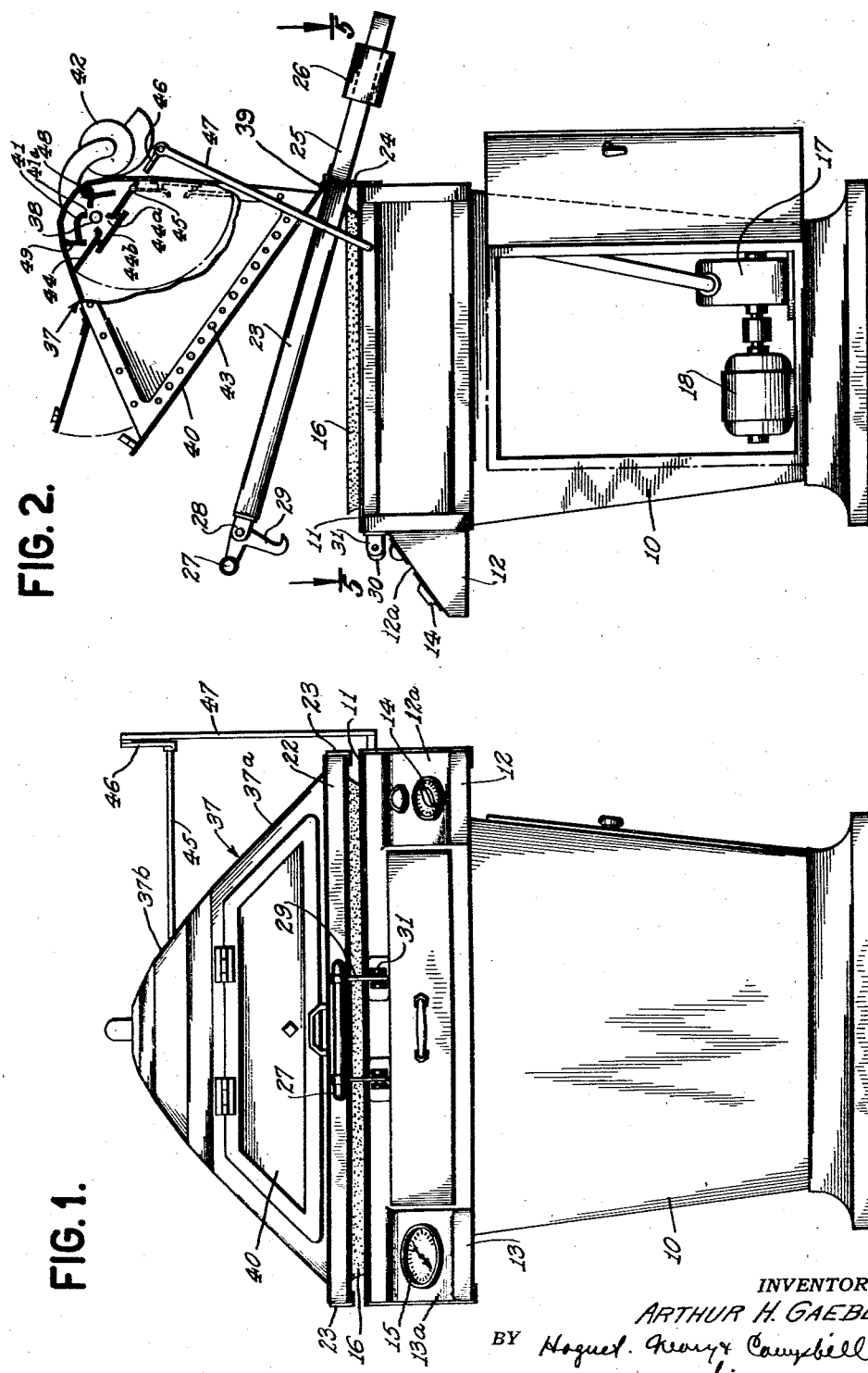

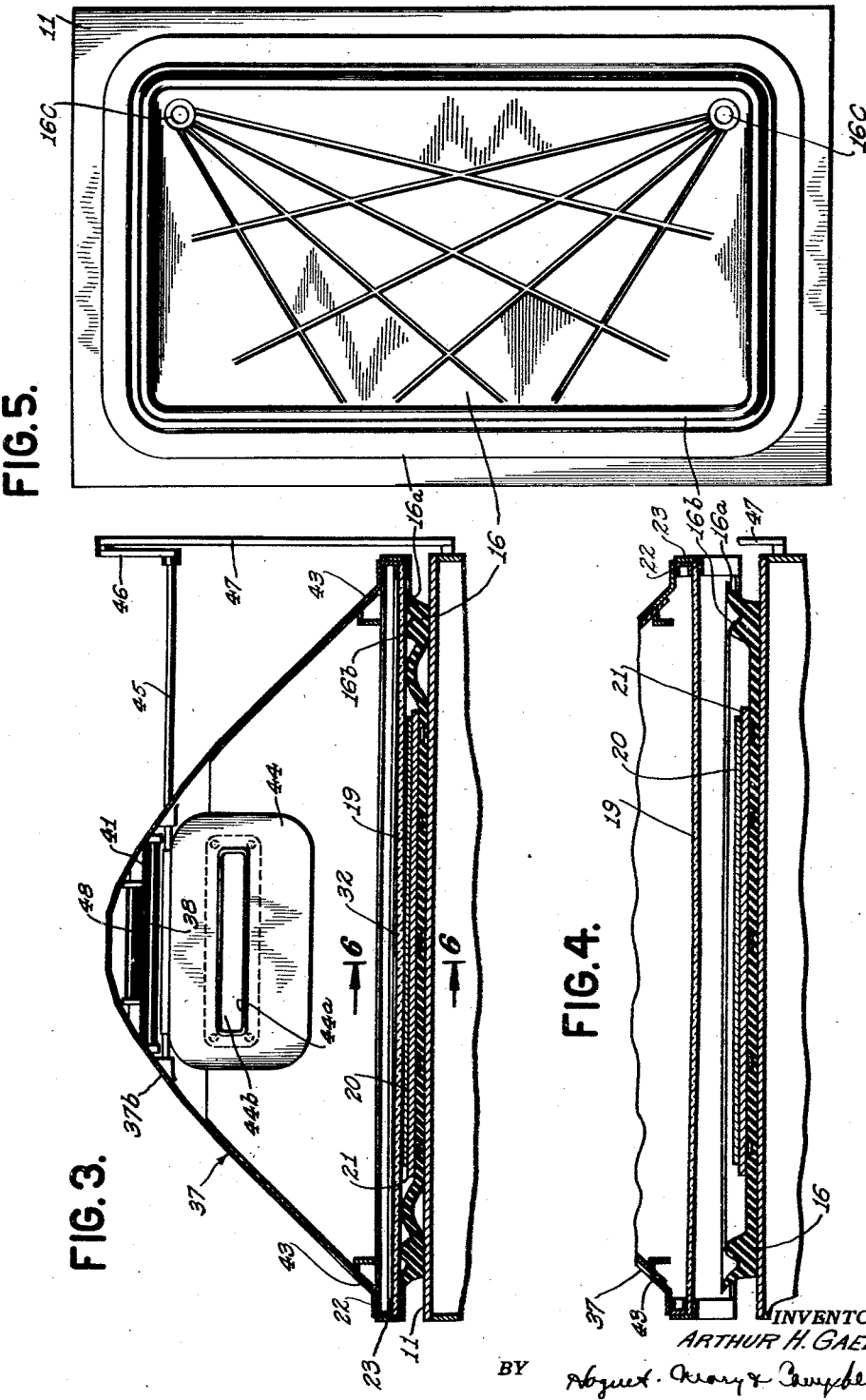

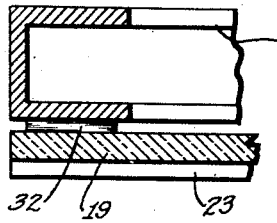
FIG. 6.
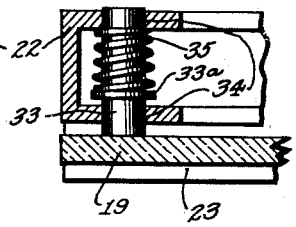
FIG. 7.
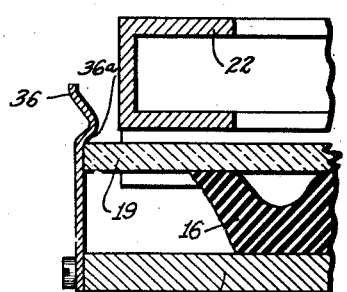
FIG. 8.
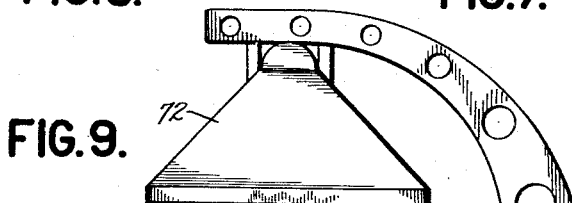
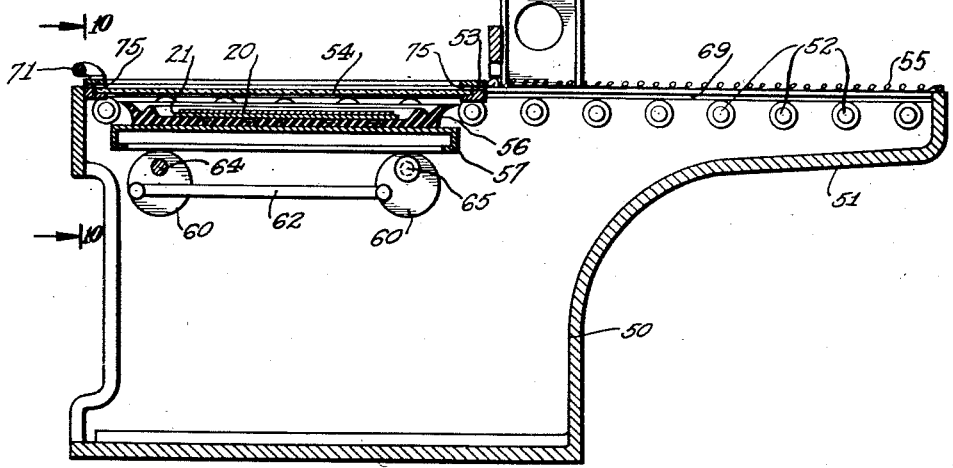
FIG. 9.
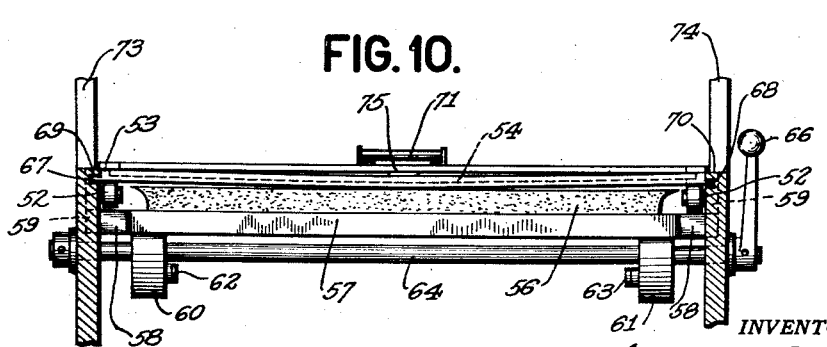
FIG. 10.
INVENTOR.
ARTHUR H. GAEBEL
BY Hoguet, Neary & Campbell
his ATTORNEYS Patented Jan. 9, 1945

UNITED STATES PATENT OFFICE 2,366,722

PHOTOGRAPHIC APPARATUS

Arthur H. Gaebel, Larchmont, N. Y.

Application July 29, 1941, Serial No. 404,488

9 Claims. (Cl. 95—76)

This invention relates to photographic apparatus and relates more particularly to improvements in vacuum printing and copying devices.

Vacuum printing devices of the type mentioned above are commonly used in photo-engraving operations, lithography and in many photographic processes. These devices usually include a frame for supporting a sheet of transparent material, such as, plate glass, called a cover glass, which cooperates with a rubber or rubberized blanket to form a space for receiving a photographic negative and a sheet of sensitized metal, paper, glass or other material to receive a print. Means, such as a vacuum pump, is provided for withdrawing the air from between the blanket and the cover glass to cause the pressure of the atmosphere to force the plates or other material into close engagement. After the exposure has been made, the vacuum is released, the blanket is separated from the cover glass and the photographic plates or films or other material can be removed.

Difficulty is often encountered in separating the photographic plate from the cover glass. In photo-engraving, for example, the photographic films are stripped on to a smooth-surfaced plate of glass so that intimate contact can be had with the metal plate. Inasmuch as the cover glass has a smooth surface, the plate often sticks to the cover glass and difficulty may be encountered in separating the plate from the cover glass. The photographic material sometimes sticks to the glass momentarily and then falls therefrom onto the plate or film thereBeneath, damaging its emulsion or breaking the plate and requiring the printing operation to be repeated to produce an undamaged print. This inherent disadvantage of prior vacuum printing frames has prevented the production of fully automatic printing devices. The means for separating the cover glass from the blanket has been operated manually, heretofore, to permit the manual separation of the photographic material from the cover glass.

In accordance with the present invention, I have provided a photographic printing device which may operate automatically including the opening of the frame and which overcomes the disadvantage of prior vacuum printing devices pointed out above.

More particularly, my improved vacuum printing or copying device may include a cover glass which cooperates with the photographic plates to cause a relative curving of the cover glass and/or the plates so that the plates will spring away and separate from the cover glass upon release of the vacuum.

Cohesion or adhesion of the photographic materials may be caused also by excessive heat. Overheating of the materials has been overcome, in accordance with the present invention, by means of a novel form of lamp housing and cooling and ventilating system, which permits long exposures to be made by means of such light sources as mercury vapor arc or quartz lamps. Some types of quartz lamps operate most efficiently at temperatures of between about 500 and 600° F. and therefore should not be cooled during their operation. These lamps will light, however, only when their temperature is less than about 150° F. Therefore, lamps of this type, after being extinguished, cannot be relighted until they have had an opportunity to cool. This characteristic is undesirable in many types of printing operations, for example, when successive exposures are being made, because of the loss of time required to cool the lamp.

In accordance with the present invention, I have provided a ventilating system for the lamp housing which draws cooling air through the housing to prevent overheating of the photographic materials without cooling the lamp while it is lighted, and which directs cooling air around the lamp when the lamp is not lighted to reduce it quickly to ignition temperature.

Other types of mercury lamps have self-contained cooling systems, such as glass water jackets through which cooling water is circulated. Such lamps have relatively long operating lives, if operated continuously, but their operating lives are diminished greatly if they are operated intermittently. For example, one type of jacketed mercury vapor lamp has an operating life of about 250 hours when operated for periods of eight hours at a time, but when operated intermittently for periods of 3 to 4 minutes, has an operating life of only about 50 hours.

Inasmuch as such lamps are expensive and it is desirable to prolong their operating lives to render them economical, the present invention includes means for permitting the lamp to operate during the short intervals between printing operations, while preventing the escape of the light during these intervals.

For a better understanding of the present invention, reference may be had to the accompanying drawings, in which:

Figure 1 is a view in front elevation of a typical form of vacuum printing device of the type embodying the invention;

Figure 2 is a view in side elevation of the vacuum printing device shown partly broken away and with the lamp housing, the frame and the doors thereof open to disclose details of the construction;

Figures 3 and 4 are views in vertical section, partly broken away, taken through the upper portion of the vacuum printing device;

Figure 5 is a plan view of a typical form of vacuum blanket embodying one of the phases of the invention;

Figure 6 is a view taken on line 6—6 of Figure 3;

Figures 7 and 8 are views in vertical section of modified forms of devices for flexing the cover glass;

Figure 9 is a view partially in section and partially in side elevation of a modified form of vacuum printing device; and Figure 10 is a view in section taken on line 10—10 of Figure 9.

One form of the device embodying the present invention is disclosed in Figures 1–6, inclusive, of the drawings. The device disclosed in Figures 1 and 2, particularly, consists of a hollow base member 10 having a flat supporting table 11 at the upper end thereof. The design of the base member is of no importance in so far as the present invention is concerned and it will not be described in detail herein.

Projecting from the front of the base member are a pair of similar housings 12 and 13 having inclined upper surfaces 12a and 13a in which are mounted a timer 14 and a vacuum gage 15, both of known construction.

The table 11 supports a vacuum blanket 16, the details of which are best shown in Figures 3, 4 and 5. As shown particularly in Figure 5, the blanket 16, which may be formed of rubber or other air-tight flexible material, is of generally rectangular shape and has a tapered outer peripheral edge 16a of great flexibility. As shown particularly in Figure 4, directly within the flexible edge 16 is a rounded rib 16b which extends in spaced relationship to the edge 16a. Inasmuch as the rib 16b is of thicker material, it is of less flexibility than the edge 16a of the blanket 16. The rib is of lesser height than the edge 16a for a reason presently to be disclosed. The blanket 16 is further provided with a coupling 16c in each of the rear corners thereof similar to valve stems to which may be connected conduits running from the vacuum pump 17 mounted within the base member 10. The vacuum pump 17 is actuated by a motor 18 under the control of the timing device 14 so that the time of operation of the vacuum pump can be regulated. The vacuum gage 15 is likewise connected to the vacuum pump to indicate the vacuum in inches created by the pump 17.

Cooperating with the vacuum blanket 16, as best shown in Figures 3 and 4, is a sheet of transparent material 19 hereinafter referred to as a cover glass which engages the vacuum blanket 16 and forms a space for receiving photographic plates 20 and 21, as shown in Figures 3 and 4. In order to seal the space between the blanket 16 and the cover glass 19, the plate is brought into engagement with the edge 16a of the vacuum blanket and the vacuum pump 17 is started. As the vacuum increases the blanket 16 is drawn up toward the cover glass 19, as shown in Figure 3, while the rib 16b is brought into sealing engagement also with the under-surface of the cover glass 19. Flexing the blanket 16 causes the edge 16a of the blanket to be deflected thereby causing it to lose contact with the cover glass. Thus, the flexible edge 16a of the blanket serves to initially seal the space between the cover glass 19 and the blanket 16 under light pressure so that a vacuum can be drawn in that space. The rib 16b being less flexible cannot afford as good sealing engagement with the plate under light pressures, but affords a good seal and will not collapse after a vacuum has been created in the space.

The atmospheric pressure on the blanket forces the photographic plates 20 and 21 into tight engagement so that the subject matter of the upper plate 20, a photographic negative, for example, can be exposed sharply on the lower plate 21, for example, a metal plate adapted to be etched subsequently to produce a printing plate.

Sometimes when the printing operation has been concluded and the cover glass 19 is moved relatively to the blanket 16 there is a tendency for the photographic negative 20 to stick to the cover glass 19, be lifted thereby momentarily and then dropped upon the sensitized metal plate, scraping or otherwise damaging it.

I have overcome this undesirable action by the construction now to be described. As best shown in Figure 4, the cover glass 19 is retained at its side edges on a generally rectangular framework 22 formed of channel iron by means of angle irons 23 which underlie the edges of the cover glass 19 and are secured to the outer sides of the channel iron frame 22. The frame 22 is connected by means of hinges 24 to the back edge of the table 11 and is provided with rearwardly extending arms 25 provided with counter-balancing weights 26 which normally rock the frame into spaced relationship with the table 11. The frame 22, bearing the cover glass 19, may be drawn down into engagement with the blanket 16 by means of the handle 27 pivotally mounted in the lugs 28 on the front end of the frame 22. The handle 27 may be provided with downwardly extending hooks 29 which are adapted to engage beneath the rollers 30 mounted in the pairs of lugs 31 on the front of the base 10. The hooks 29 are designed to merely engage beneath the rollers 30 so that a light pressure can be exerted on the blanket 16 by means of the cover glass 19, but not to lock the frame 22 to the table 11. With this type of construction the frame 22 may be brought down so that the cover glass 19 may come into sealing engagement with the blanket 16 until a vacuum is drawn in the space between them. Thereafter the cover glass 19 is retained in its lower position by the weight of the blanket 16 so long as the vacuum is maintained in the space. However, upon breaking the vacuum, the counterbalancing weights 26 will swing the frame 22 upwardly, thus permitting the photographic plates to be removed from the blanket 16.

In order to prevent the photographic plate 20 from sticking to the cover glass 19, a shim 32. Figures 3 and 6, is inserted between the frame 22 and the cover glass 19 at the front and rear of the frame in order to flex the cover glass 19 slightly. This slight curvature of the glass 19 is sufficient to bend the photographic plates 20 and 21 slightly when the vacuum is drawn on the blanket 16 and thus place them under tension so that when the vacuum is released the inherent resiliency of the plates 20 and 21 will cause them to snap loose from the cover glass 19 and remain on the blanket 16.

While I have shown the use of a shim 32 between the cover glass 19 and the frame 22, it will be understood that a normally curved cover glass 19 may be used with similar results or a flat cover glass may be used in conjunction with curved photographic plates. Also, when very large cover glasses are used, the cover glass may be supported at its sides, only, the weight of the glass being sufficient to permit the slight flexing required to separate the photographic plates from the cover glass. Moreover, other forms of devices for flexing the cover glass 19 may be used, if desired. For example, as shown in Figure 7, the cover glass 19 may be flexed by a pin 33 which passes through apertures 34 in the frame 22 and is urged toward the cover glass by means of a spring 35 which engages a flange 33a on the pin and the upper flange of the channel iron frame 22.

Another form of device for flexing the cover glass is shown in Figure 8. In this device, the flexing member may consist of a spring tongue 36 having a corrugation 36a therein which engages the upper edge of the cover glass 19 when the latter is brought into engagement with the blanket 16. The spring tongue 36 is secured to the forward edge of the table 11. When the counterbalancing weight 26 swings the frame 22 upwardly, the corrugation 36a exerts a drag on the cover glass 19, thereby flexing it slightly and causing separation of the photographic plate 20 from the plate 19, as described above.

From the above description, it will be clear that slight bending of the cover glass is sufficient to disengage the photographic plate from the cover glass. It is to be noted that in the forms of the invention disclosed in Figures 6 and 7 the printing operations are conducted while the cover glass is slightly curved, and that in the other forms of the invention, the cover glass is flat during the printing operations, but is flexed as the cover glass 19 moves away from the blanket 16.

The form of the device disclosed in Figures 1 and 2 may also be provided with a housing 37 of novel construction for a lamp 38 which directs light through the cover glass 19 onto the photographic plates retained therebeneath. The lamp housing 37 may be connected at its rear edge to the rear edge of the frame 22 by means of the hinges 39 so that the lamp housing can be lifted for inspection and cleaning of the cover glass 19.

The housing 37 is provided with a hinged closure 40 in its front side which may be opened for inspection and burning in or blocking out operations during exposure.

The lamp 38 may be an elongated quartz lamp which is supported in suitable sockets adjacent the top of the lamp housing 37. In order to assure proper illumination of the photosensitive materials, the lamp housing 37 may be formed with a lower portion 37a of generally frusto-pyramidal shape and the upper reflecting portion 37b of generally dome-shape. The reflecting portion 37a is made up of a series of superimposed conic sections of proper width and slant to direct light downwardly onto the cover glass 19. In photo-engraving operations, more light should be directed to the edges of the plates than to their centers, for the reason that the metal plates are more heavily coated at their edges than at their centers as an incident of their manner of production.

Inasmuch as quartz lamps generate considerable heat and require a high temperature for efficient operation, they might, if used continuously over a long period of time in exposing photographic material, heat and damage the emulsion of the photographic materials. Accordingly, means are provided for cooling the housing 37, without cooling the lamp during its operation. The cooling means may consist of a fan 42 communicating with the top of the housing 37 behind a baffle plate 41 of generally inverted W-shape for withdrawing heated air therefrom. Air may be drawn into the lamp housing through suitably baffled apertures 43 around the lower periphery of the housing. The air sweeps across and cools the cover glass 19, passes along the walls of the housing and behind the baffle plate 41 out of contact with the lamp 38.

Inasmuch as quartz lamps will not ignite unless they are in an initially cool state, i. e., 150° F. or less, I have provided a mechanism for quickly cooling the lamp after an exposure has been made. This mechanism includes a shutter 44 having an elongated slot 44a therein through which air can be drawn and a spaced light baffle 44b overlying the slot 44a. The shutter 44 has a shaft 45 at one edge thereof which is rotatably supported at the back of the housing 37 so that the shutter can be swung flatly, as shown in dotted lines, against the back wall of the housing or transversely of the housing, as shown in full lines, where the slot is disposed beneath the lamp 38. The shutter 44 can be swung between its two positions by means of a lever 46 fixed to the end of the shaft 45 and a link 47 pivotally connected to the table 11 and the lever 46. Air is drawn around the lamp 38 behind the baffle 44b through the slot 44a and through a slot 41a in the apex of the baffle 41 by means of the fan 42. The slot 41a is normally closed by means of the roller 48 when the reflector is swung down, as shown in dotted lines. When, however, the reflector 41 swings up, the roller 48 moves out of the apex of the reflector 41 by gravity against one side of the housing 37, at least partially blocking the passage on one side of the baffle 41 thereby exposing the slot 41a and permitting cooling air to be drawn around the lamp 38. The passage on the opposite side of the baffle 41 may be closed temporarily by means of a hinged flap 49.

The fan 42 may be manually controlled so that it can be started at the beginning of a printing operation and permitted to run after the printing operation is completed and the lamp 38 is extinguished. If desired, a thermostatic switch may be mounted adjacent to or in contact with the lamp 38 to shut off the fan 42 when the lamp cools to ignition temperature.

With devices of the type described above, printing operations are greatly simplified because of the automatic operation of the device. All that is required is to place the photographic plates between the blanket 16 and the cover glass 19, draw the frame and lamp housing downwardly, start the fan 42 and timing mechanism 14 which automatically starts the vacuum pump 17 and lights the quartz lamp 38 to make the exposure. No further attention need be paid to the device inasmuch as the timing device automatically exposes the plates for the required time and thereafter shuts off the light and stops the vacuum pump and permits the frame 22 to rise so that the photographic plates may be removed therefrom. The fan 42 is permitted to run if other printing operations are to be conducted or may be controlled by the temperature of the lamp as described above.

The shutter 44 may be used in conjunction with a water-cooled lamp to permit the lamp to burn between successive printing operations. With this type of lamp the baffle 41 and, in some instances, the fan 42 may be omitted, if desired.

A modified form of printing device is disclosed in Figures 9 and 10 of the drawings. This form of device includes a supporting base 50 having a rearward extension 51 thereon. The base 50 may be hollow and may be used for storage purposes. Mounted adjacent the upper edge of the base 50 and the rearward extension 51 are a plurality of rolls 52 which support a frame 53 for the cover glass 54 for sliding movement longitudinally of the base and extension. The frame 53 is normally drawn into the extension 51 by means of suitable springs or, if desired, a counter-weight, and may be drawn manually toward the front of the device.

A vacuum blanket 56 similar to the blanket 16 is supported upon a table 57 which is mounted for vertical movement in the frame 50. The table 57 is guided in the frame by means of a plurality of laterally projecting lugs 58 which engage in vertical grooves 59 in the side of the frame 50. Upward movement is imparted to the table 57 by means of two pairs of cams 60 and 61 at opposite sides of the table, the cams 60 and the cams 61 being connected by links 62 and 63. The front cams 60 and 61 are mounted eccentrically on a shaft 64 and the rear cams 60 and 61 are mounted eccentrically on a transverse shaft 65, the shafts 64 and 65 being journaled in the sides of the frame 50. The shaft 64 is provided with an actuating handle 66 by means of which all of the cams may be rotated to lift the table 57 and force it against the cover glass 54 when the cover glass is in its forward position. Upward movement of the cover glass 54 is prevented by means of laterally projecting flanges 67 and 68 which are received in grooves 69 and 70, respectively, in the side members of the frame 50.

With this construction the cover glass 54 in its supporting frame 53 is normally retained at the rear of the base 50 while the rubber blanket 56 is normally in its lowermost position. When a printing operation is to take place, the photographic materials are placed upon the rubber blanket 56, the cover glass 54 is drawn forward by means of the handle 71 into a position overlying the blanket 56, as shown in Figure 9, and the handle 66 is pulled forward to raise the table 57 and bring the blanket 56 into contact with the undersurface of the cover glass 54. A vacuum is drawn in the space between the blanket 56 and the cover glass 54, causing the blanket to adhere to the cover glass and retaining the matter in its forwardmost position until the printing operation is finished. When the vacuum is broken, the table 57 and the blanket 56 return by gravity to their initial positions and the cover glass 54 is freed for return movement by means of the springs 55 into the extension 51 of the base 50.

In order to prevent the photographic plates or other material from sticking to the cover glass 54, the latter may be bowed transversely in a manner similar to the cover glass 19 described above. As illustrated, the frame 53 may be provided with shims 75 at the centers of its front and back sides which bear against the centers of the front and rear edges of the cover glass 54. It will be understood, of course, that other types of devices may be used for flexing the cover glass 54, such as, for example, the forms of the devices disclosed in Figures 7 and 8 of the drawings.

Light for exposing the photographic material may be supplied by means of a source of illumination (not shown) in a lamp housing 72 which is supported by a pair of arms 73 and 74 which extend upwardly and forwardly from the supporting base or frame 50. Inasmuch as this form of lamp housing is spaced from the cover glass 54, overheating of the cover glass and the photographic material is not possible and, therefore, any desired type of light source, such as, for example, carbon arcs may be used.

From the preceding description of typical forms of the invention, it will be apparent that I have provided a simple and readily usable type of device for photographic printing operations. The number of motions required to make a print are materially reduced and the possibility of damaging the photographic material either through heat applied thereto or because of dropping of the photographic material from underneath the cover glass is eliminated.

While vacuum printing frames of the type embodying the invention are particularly adapted to photographic printing apparatus, they may be used with equal facility for holding subject matter to be copied by photostating or photographic copying apparatus and the like and thus are adaptable for use in various fields. It will be understood, therefore, that devices of the type embodying the present invention are susceptible to considerable variation in their construction and in their usage and, therefore, the forms of the invention disclosed herein should be considered as illustrative and not as limiting the scope of the following claims.

I claim:

1. In a vacuum printing device, the combination of a transparent member having a slight transverse curvature, a flexible blanket adapted to receive a substantially flat photographic plate and being engageable with said transparent member, and means for drawing a vacuum between said blanket and said member to permit atmospheric pressure to flex said plate into conformity with the curvature of said member, whereby upon breaking said vacuum the plate will straighten and free itself from said member.

2. In a vacuum printing device, the combination of a substantially flat transparent member, a cooperating air-tight blanket having raised edges engageable with said transparent member, means for drawing a vacuum between said member and said blanket, and means for flexing said transparent member slightly to impart a transverse curvature thereto.

3. In a vacuum printing device, the combination of a substantially flat transparent member, a frame supporting said member, means on said frame for flexing said member to impart a transverse curvature to said member, a flexible blanket engageable with said member and means for evacuating the space between said blanket and said member.

4. In a vacuum printing device, the combination of a table, an air-tight blanket having raised edges thereon supported on said table, a generally rectangular frame hingedly connected at one edge to an edge of said table, a substantially flat cover glass supported by said frame engageable with the raised edges of said blanket and with a photographic plate on said blanket, means normally urging said frame away from said blanket, means for drawing a vacuum between said cover glass and said blanket, and means for flexing said cover glass slightly to cause a photographic plate to separate from said cover glass upon release of said vacuum and movement of said cover glass away from said blanket.

5. In a vacuum printing device, the combination of a cover glass, a frame supporting said cover glass, a flexible blanket having edge portions engageable with said cover glass, means for drawing a vacuum between said blanket and said cover glass and a shim on said frame for bending said cover glass to render photographic plates pressed against said member by atmospheric pressure readily releasable upon breaking said vacuum.

6. In a vacuum printing device, the combination of a cover glass, a frame supporting said cover glass, a flexible blanket having edge portions engageable with said cover glass, means for drawing a vacuum between said blanket and said cover glass and resilient means for flexing said cover glass to render photographic plates pressed against said cover glass by atmospheric pressure readily releasable upon breaking said vacuum.

7. In a vacuum printing device, the combination of a table, an air-tight blanket having raised edges thereon supported on said table, a generally rectangular frame hingedly connected at one edge to an edge of said table, a cover glass supported by said frame, and engageable with the raised edges of said blanket, means for drawing a vacuum between said cover glass and said blanket, and means on said table releasably engaging an edge of said cover glass for flexing said cover glass relatively to said frame.

8. In a printing device, the combination of relatively movable table and a lamp housing for directing light toward said table, a vacuum blanket supported on said table, a cover glass between said lamp housing and said table and movable relatively to said table, means for moving said cover glass and said blanket into engagement, means for drawing a vacuum between said cover glass and said blanket for retaining them in engagement, means responsive to breaking of said vacuum for separating said blanket and said glass member, and means for flexing said cover glass to separate from said cover glass a photographic plate cohering to said cover glass.

9. In a printing device the combination of a lamp housing, a table movable toward and away from said lamp housing, a cover glass slidable relatively to said table into positions covering and exposing said table, means normally urging said cover glass into a position exposing said table, a vacuum blanket supported on said table, means for moving said table to bring said blanket into engagement with said cover glass, means for drawing a vacuum between said cover glass and said blanket for retaining them in engagement, and means for flexing said cover glass slightly to cause a photographic plate cohering to said cover glass to separate therefrom upon breaking said vacuum.

ARTHUR H. GAEBEL.